July 24, 1928.
A. W. REED
1,678,604
VEHICLE SANDING MECHANISM
Filed Jan. 6, 1926　　3 Sheets-Sheet 1
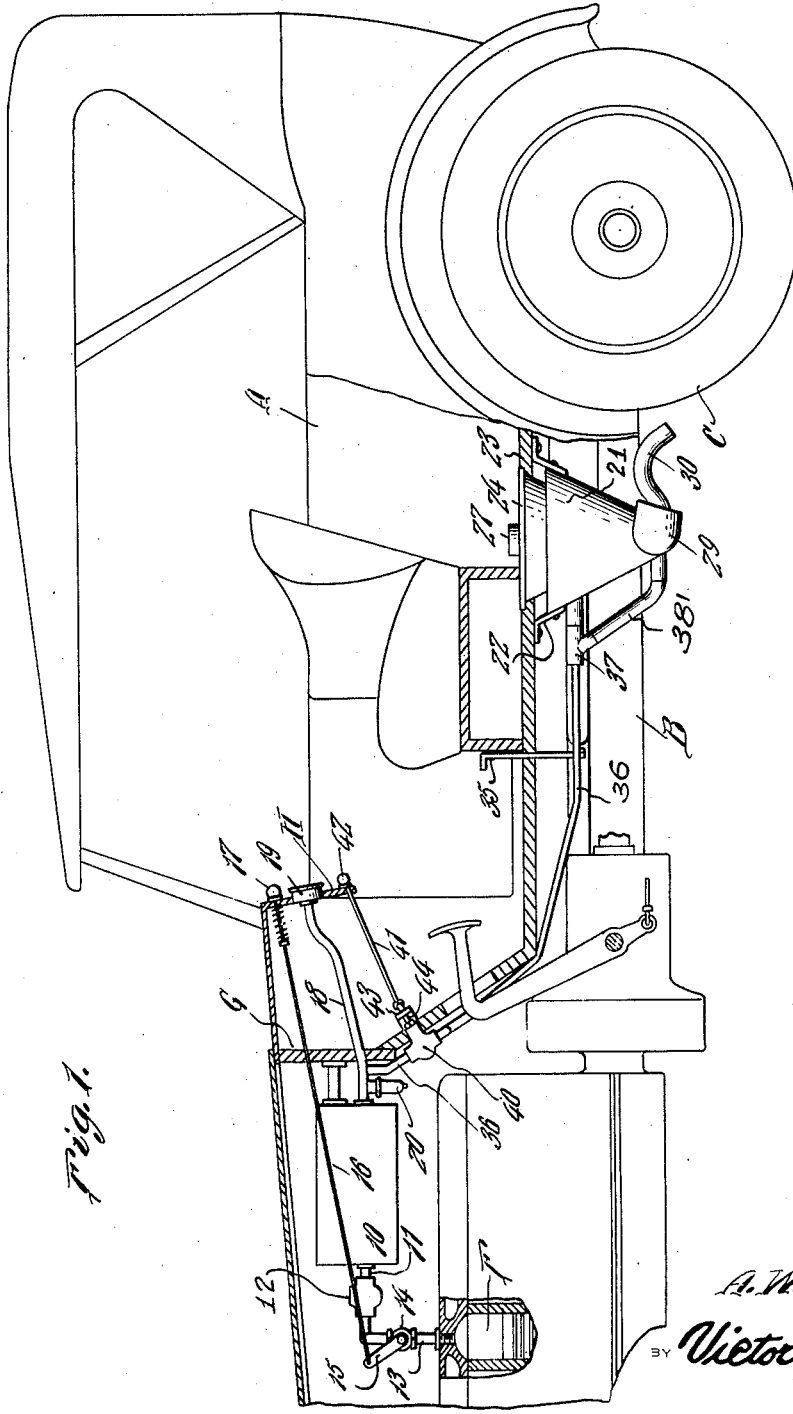

July 24, 1928.
A. W. REED
1,678,604
VEHICLE SANDING MECHANISM
Filed Jan. 6, 1926     3 Sheets-Sheet 2
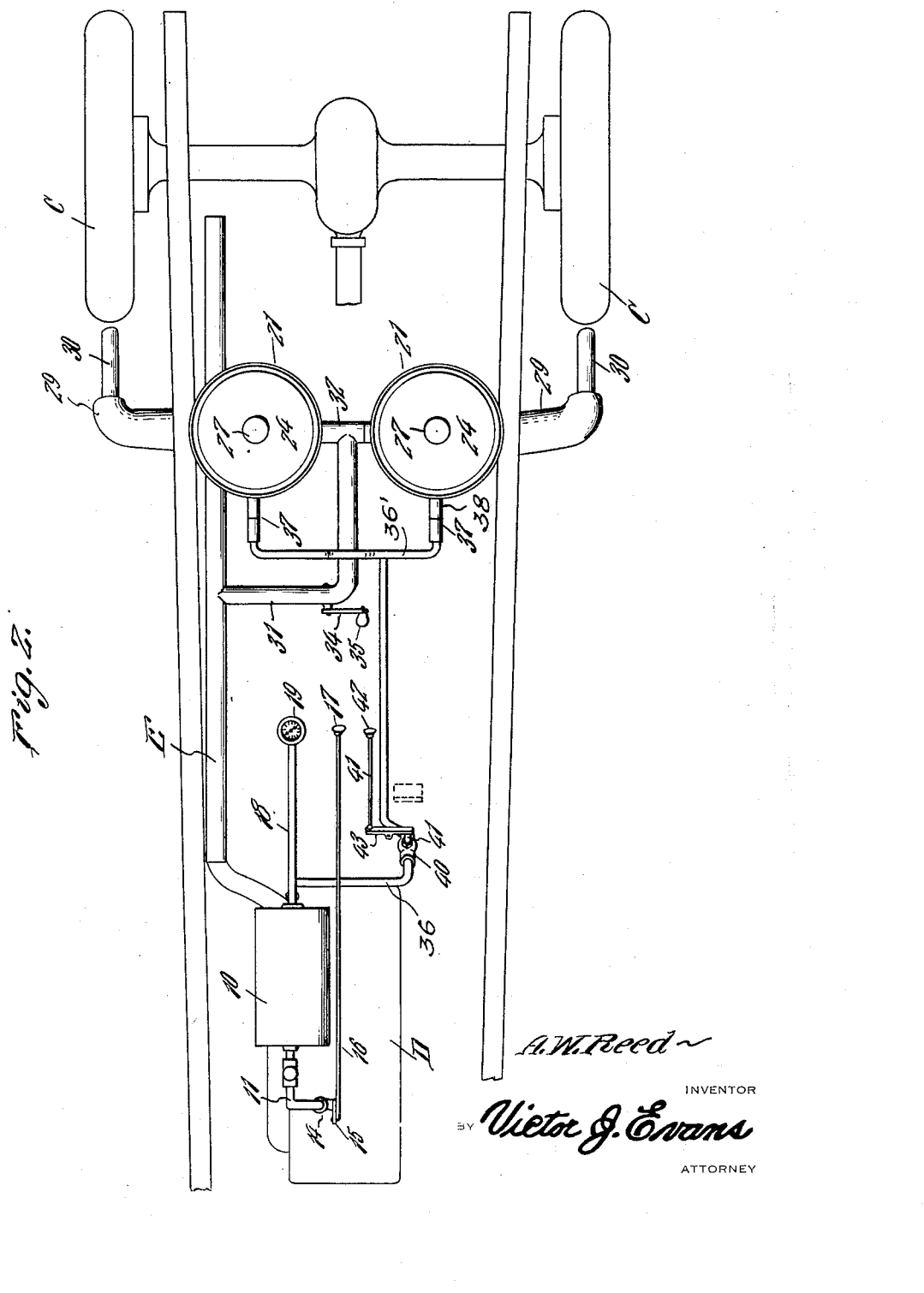

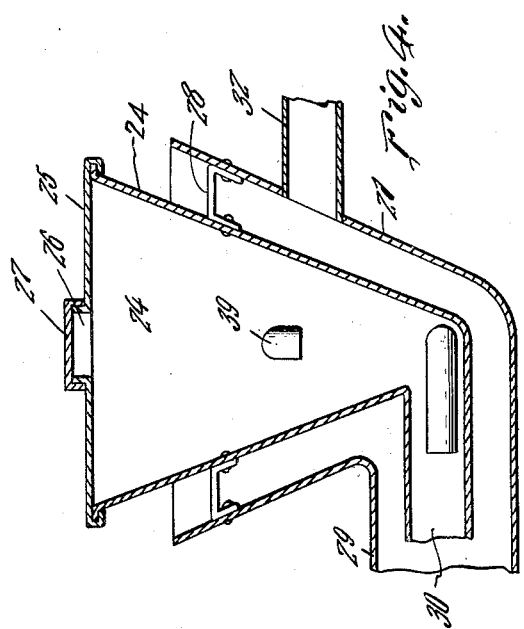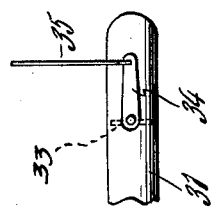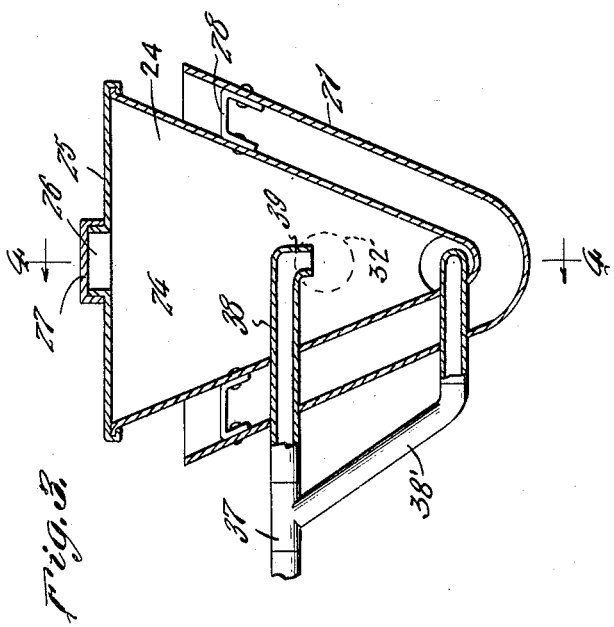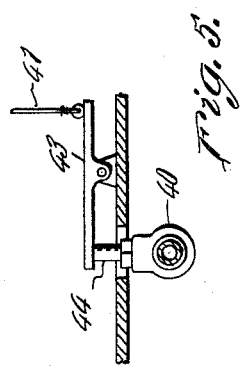

Patented July 24, 1928.

1,678,604

UNITED STATES PATENT OFFICE.

ARTHUR W. REED, OF BOSTON, MASSACHUSETTS.

VEHICLE SANDING MECHANISM.

Application filed January 6, 1926. Serial No. 79,624.

This invention relates to attachments to or accessories for use in connection with motor vehicles, and has for its object the provision of a novel mechanism by means of which sand may be applied to the roadway in advance of the vehicle wheels whereby to prevent slipping or skidding thereof in wet or slippery weather, especially when the brakes are applied preparatory to making a stop or for effecting a stop.

An important object of the invention is to provide a novel compressed air or fluid actuated mechanism under control of the operator or driver of the vehicle whereby sand may be applied in advance of the wheels, the compression necessary for the action being furnished by the motor or engine and being stored up within a suitable reservoir ready for instant use.

Still another object of the invention is to provide an apparatus of this character in which the heat from the exhaust pipe of the engine is utilized to maintain the sand in a dry condition and also to prevent freezing thereof in cold weather, the operation of the sanding mechanism being consequently assured, even under the most adverse circumstances.

Another object of the invention is to provide a mechanism of this character embodying a suitable control valve for cutting off or on the supply of fluid pressure to the storage tank, other means being provided whereby the fluid under compression may be permitted to pass to the actual sanding device itself, the exhaust pipe or element connected therewith being likewise provided with a selectively usable control, depending upon the temperature and circumstances.

An additional object is to provide a mechanism of this character which will be comparatively simple and inexpensive in manufacture, easy to install and use, positive in action, efficient and durable in service, and a general improvement in the art.

With the above and other objects and advantages in view, the invention consists in the details of construction and the arrangement and combination of parts to be hereinafter more fully described and claimed, and illustrated in the accompanying drawings, in which:—

Figure 1 is a side elevation of a motor vehicle, partly broken away and in section to show the invention in applied position.

Figure 2 is a top plan view of the chassis with the invention applied.

Figure 3 is a detail vertical section taken through one of the sanding devices.

Figure 4 is a section at right angles to Figure 3 taken on the line 4—4 thereof.

Figure 5 is a detail sectional view illustrating one of the control devices, and Figure 6 is a detail view showing another device interposed in the heating means.

Referring more particularly to the drawings, the letter A designates a motor vehicle including the usual chassis B which is of course equipped with the usual mechanical elements or parts which are, to a certain extent, shown in more or less detail but which are not described inasmuch as they form no part of the present invention. Suffice it to say that the letter C designates the rear wheels in advance of which it is desired to deposit sand so as to prevent sliding or skidding. The engine of the vehicle is designated by the letter D and has the usual exhaust pipe E which may lead directly to the atmosphere or to a muffler, as preferred, such details being absolutely immaterial in the present instance. The letter F represents one of the engine cylinders and is referred to for a reason to be explained.

In carrying out the invention, I provide a suitable storage tank 10 mounted in any desired or preferred location either above the engine or adjacent thereto, it being preferable, for reasons of convenience only, that this tank be located above the engine and beneath the hood of the vehicle as well as in advance of the instrument board or dash G thereof. Connected with one end or other portion of the tank 10 is an inlet pipe 11 within which is interposed a check valve 12 which connects, through a pipe 13, with a suitable hole or port drilled or otherwise formed through the cylinder head of the engine or other convenient portion thereof so that the pressure developed within any one of the cylinders may be utilized for storing compression within the tank 10. Interposed in the pipe 13 is a suitable cutoff valve 14 which may be of any ordinary or preferred type and which in the present instance is represented as having its rotatable closure element provided with a handle or lever 15 with which connects a rod or other suitable member 16 extending through the instrument board H of the vehicle and equipped with a finger or hand hold 17. Obviously, when the valve 14 is in closed position no pressure can be communicated to the tank 10, whereas when the reverse is true, the tank 10 may be supplied with compressed fluid, air or a mixture of a gasoline vapor and air. Connected with the tank 10 is a suitable pipe 18 leading to a gage 19 which is preferably located upon the instrument board H so that the operator may tell at a glance just exactly what is the pressure within the tank 10 so that he will know whether or not to open or close the valve 14 by the means provided. If preferred, a safety valve 20 may be connected with the tank or with the pipe 18 as shown in Figure 1 so as to provide means whereby any excess pressure may escape without injury to the parts.

Located at some suitable position, preferably beneath the floor boards of the vehicle, are tanks or containers which includes outer casings or shells 21. The tanks as well as the casings 21 in the present instance are represented as being of conical shape, this particular form of tank being of advantage inasmuch as clogging of sand therein is less likely to occur. Any preferred means such as brackets 22 may be provided for holding these casings 21 in place and it is of course intended that the tanks are to be filled with sand of the proper texture or quality. The tanks are arranged in openings 23 in the floor of the vehicle.

In the present instance, the tanks which are indicated by the reference numeral 24 are shown as being of conical shape as above set forth and have top members 25 provided with openings 26 normally closed by caps 27. The tanks 24 are each spaced inwardly within the casings 21 as for instance by means of brackets 28 or the like so that the casings 21 provide a jacket or air chamber about the tanks 24 for the purpose of preventing freezing. It is of course intended that the tanks 24 be initially filled with sand and it is likewise clear that the casings 21 and tanks 24 are so constructed and arranged as to provide outlets 29 from which lead discharge pipes 30 terminating at a point in advance of the rear wheels of the vehicle. Of course, it is quite clear that if desired the same type or structure may be provided in connection with the front wheels for effecting sanding of the roadway in advance thereof.

As a precaution against freezing of the sand within the members 24, I provide a pipe connection 31 which communicates with the exhaust pipe E and which connects with a pipe member 32 which extends between and into both members 24, there being two of the latter illustrated in the present instance. Located or interposed within the pipe 31 is a throttle valve 33 having its spindle equipped with an operating arm 34 connected with a member 35 which extends upwardly through the floor of the vehicle into a position within convenient reach of the driver or operator so that this valve or throttle 33 may be opened to a greater or less extent depending upon the temperature prevailing.

Leading from the storage tank 10 or from the pipe 18 leading to the gage 19 is a pipe or other conduit 36 which connects with a branch pipe 36' with Y's 37, or other equivalent couplings. These couplings are connected not only with the pipe members 38 but also with other pipe members 38' which together with the pipe members 38 extend through the outer shells 21 and tanks 24 as best shown in Figures 3 and 4 of the drawings, and the pipe members 38 have downturned inner ends 39 located axially of the tanks 24. Interposed in the pipe 36 is a suitable control or cutoff valve 40 having a suitable plug 44, not shown in detail, with which is connected a rod 41 journaled through the instrument board H and carrying a handle 42. The pipe members 38' depend from the Y-connections at an inclination, thence pass through the outer shells or casings 21, the tanks 24 and terminate in the pipes 30 as best shown in Figure 4 of the drawings.

In the operation of the device, it will be apparent that when the engine is in operation or motion and the throttle valve 33 open, a portion of the exhaust from the engine will pass through the pipe 31 into the pipe 32 so that the heat will be communicated through the latter to casings 21 and thence by radiation to the contents of the tank receptacles or containers 24. Quite obviously, this will prevent freezing even in the most severe weather. Under ordinary circumstances, it is intended that the valve 14 be opened so that the operation of the engine will cause pressure to be stored up within the tank 10, the degree of pressure being readily ascertainable by inspecting the gage 19. Whenever the operator finds it necessary to stop, especially suddenly as in an emergency, it is intended that he grasp the member 42 and pull thereupon so as to apply a pull to the pivoted lever 43 which connects therewith and which engages the plunger or plug 44 of the valve or valves 40. When this is done, it will be quite apparent that the partial, or total as the case may be, opening of the valve 40 will permit pressure to pass from the tank 10 through the pipe member or members 36 to the tank or tank members 24 contained within the members 21. Quite obviously, owing to the fact that the discharge ends of the pipes 38 are downturned, the compression applied into the tanks 24 will operate to force the sand therein to the discharge pipe 30, the sand passing through the discharge pipes 30 by the pressure from the pipes 38' to points immediately in advance of the vehicle wheels. Naturally, this will act to provide a rough surface so that the wheels can not slip or skid. Of course the air pressure within the tank can be readily controlled and it is equally true that the amount of exhaust gases fed to the sand containers may be just as easily controlled, the same being likewise true of the degree of opening of the control valves. It is believed that the construction, operation and advantages will be readily apparent to one skilled in the art without further explanation.

While I have shown and described the preferred embodiment of the invention, it should be understood that I reserve the right to make such changes in the form, construction and arrangement of parts as will not depart from the spirit of the invention or the scope of the subjoined claim.

Having thus described the invention, I claim:—

In a sanding device for a motor vehicle, a storage tank, a check valve connection between a cylinder of the engine of the vehicle and the storage tank, a control valve interposed between the cylinder and the check valve, sand containers having outlets, a connection between the storage tank and the sand containers, a materially controlled valve in said last named connection and means whereby the second and last mentioned valves can be controlled from the instrument board of the vehicle.

In testimony whereof I affix my signature.

ARTHUR W. REED.